United States Patent
Yang et al.

(10) Patent No.: US 9,722,910 B2
(45) Date of Patent: Aug. 1, 2017

(54) TRANSIT DOMAIN CONTROL

(71) Applicant: CISCO TECHNOLOGY, INC., San Jose, CA (US)

(72) Inventors: Yi Yang, Morrisville, NC (US); Alvaro E. Retana, Raleigh, NC (US); Keyur Patel, San Jose, CA (US); Fabien Degouet, Mexico (MX)

(73) Assignee: CISCO TECHNOLOGY, INC., San Jose, CA (US)

( * ) Notice: Subject to any disclaimer, the term of this patent is extended or adjusted under 35 U.S.C. 154(b) by 146 days.

(21) Appl. No.: 14/666,786

(22) Filed: Mar. 24, 2015

(65) Prior Publication Data

US 2016/0285740 A1    Sep. 29, 2016

(51) Int. Cl.
*H04L 12/56* (2006.01)
*H04L 12/715* (2013.01)
*H04L 12/66* (2006.01)
*H04L 29/06* (2006.01)

(52) U.S. Cl.
CPC .............. *H04L 45/04* (2013.01); *H04L 12/66* (2013.01); *H04L 63/101* (2013.01); *H04L 65/1036* (2013.01)

(58) Field of Classification Search
CPC ....................................................... H04L 45/04
See application file for complete search history.

(56) References Cited

U.S. PATENT DOCUMENTS

| | | | |
|---|---|---|---|
| 7,698,464 B2 | 4/2010 | Jamieson et al. | |
| 7,710,902 B2 | 5/2010 | Vasseur et al. | |
| 8,495,245 B2 | 7/2013 | Busschbach | |
| 8,559,334 B2 | 10/2013 | Iovanna et al. | |
| 2005/0089015 A1* | 4/2005 | Tsuge | H04L 45/04 370/351 |
| 2007/0165532 A1 | 7/2007 | Retana et al. | |
| 2008/0247392 A1* | 10/2008 | White | H04L 45/04 370/392 |
| 2010/0265956 A1* | 10/2010 | Li | H04L 45/04 370/401 |
| 2012/0331555 A1 | 12/2012 | Retana et al. | |
| 2014/0129735 A1 | 5/2014 | Thyni et al. | |
| 2014/0369356 A1* | 12/2014 | Bryant | H04L 45/745 370/392 |
| 2014/0376371 A1 | 12/2014 | Flinck et al. | |
| 2015/0009806 A1 | 1/2015 | Bashandy et al. | |

OTHER PUBLICATIONS

Rekhter, Y., et al., "A Border Gateway Protocol 4 (BGP-4)," Network Working Group RFC 4271; Jan. 2006; 104 pages.

* cited by examiner

*Primary Examiner* — Shaq Taha
(74) *Attorney, Agent, or Firm* — Patent Capital Group

(57) ABSTRACT

A method for controlling transit of routing messages in a network comprising multiple autonomous systems (AS) is disclosed. The method includes receiving, at a first AS, a routing message of an inter-AS routing protocol and identifying that the routing message comprises transit domain control (TDC) information specifying one or more autonomous systems to which the routing message may be propagated and/or one or more autonomous systems to which the routing message may not be propagated. The method further includes propagating the routing message from the first AS to a second AS in accordance with the TDC information.

27 Claims, 6 Drawing Sheets

TRANSIT DOMAIN CONTROL

TECHNICAL FIELD

This disclosure relates in general to the field of communications and, more particularly, to methods and systems for controlling transit of routing messages in a network comprising multiple autonomous systems, the methods and systems particularly suitable for use with a Border Gateway Protocol.

BACKGROUND

The Internet may be viewed as a collection of Autonomous Systems, where an "Autonomous System" (AS) typically refers to a set of network elements, such as e.g. routers, switches, and controllers, under a single technical administration. The term "network elements" may refer to network elements which could include not only actual physical devices and systems but also devices and systems implemented entirely in software and/or could also include virtual devices and systems components. An AS may also be considered to include hosts connected to the network. Segregation into different AS's allows defining administrative authorities and routing policies of different organizations.

Each AS is "autonomous" (i.e., relatively independent from the other AS's) in a sense that is runs its own independent routing policies and unique Interior Gateway Protocols (IGPs). Exterior routing protocols were created, the current Internet standard EGP being the Border Gateway Protocol (BGP), to exchange routing information between different AS's. For example, the BGP defines an inter-AS routing protocol, where one of the primary functions is to exchange network reachability information (NLRI) using a so-called "BGP speaking system" (also often referred to as a "BGP speaker").

A BGP speaker typically has the liberty to decide whether it should exchange some NLRIs with certain peers according to a local policy. However, transit control mechanisms that ensure that NLRIs are propagated to certain peers but not others are cumbersome to manually maintain. Therefore, a need exists for an improved transit domain control, in particular an improved BGP transit domain control.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
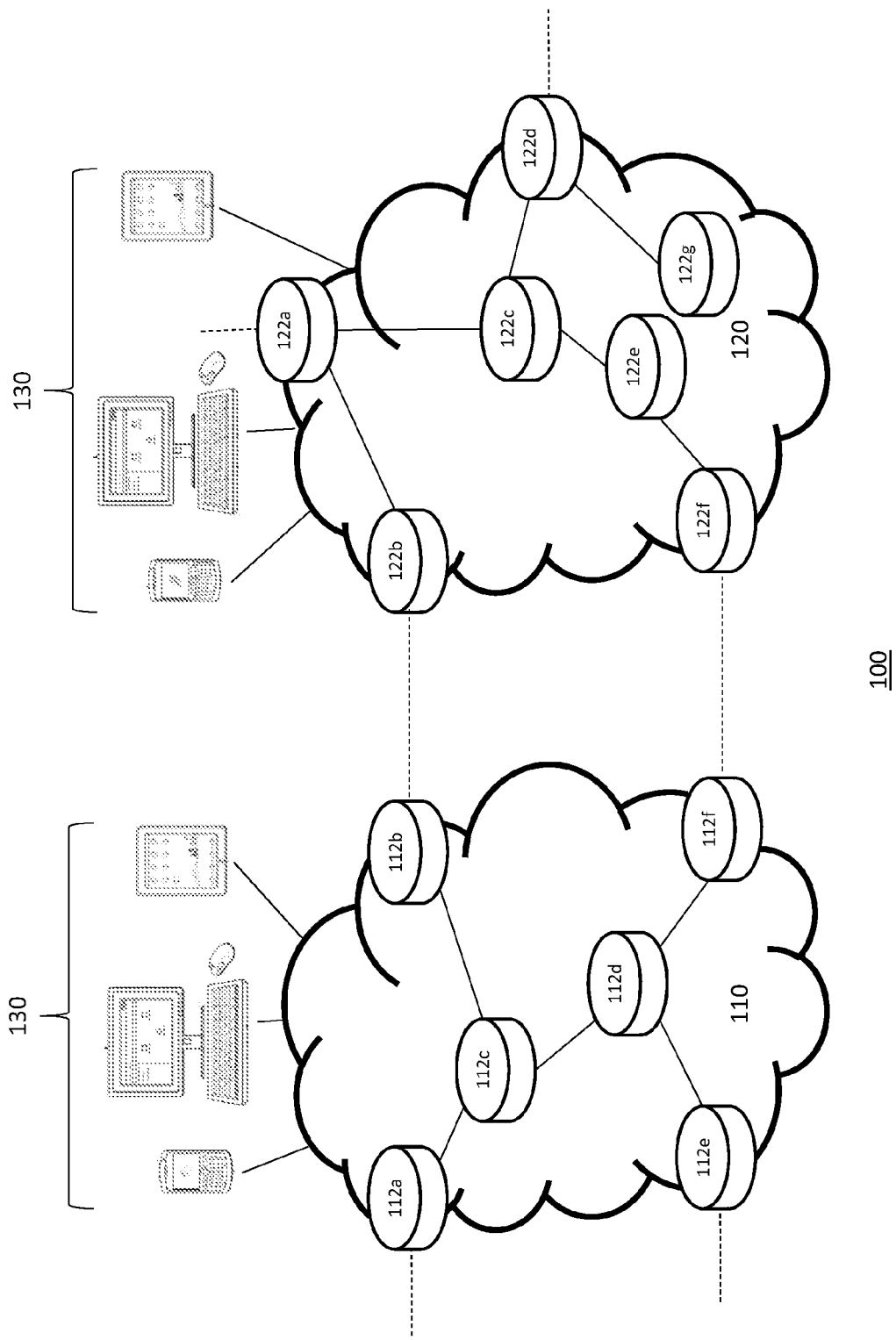
FIG. 1 is a simplified schematic diagram illustrating routing basics within a network comprising multiple AS's.

In one aspect, embodiments presented herein may relate to a computer-implemented method for controlling transit of routing messages in a network comprising multiple AS's. The method includes steps of receiving, at a first AS, a routing message of an inter-AS routing protocol, identifying that the received routing message comprises transit domain control (TDC) information specifying (i.e., identifying) one or more AS's to which the routing message may be propagated and/or one or more AS's to which the routing message may not be propagated, and propagating the routing message from the first AS to a second AS (the second AS being different from the first AS) in accordance with the identified TDC information.

In an embodiment, the TDC information may be included within a TDC attribute comprising a path segment value field encoding (i.e., carrying) one or more identifications of the autonomous systems to which the routing message may be propagated and/or one or more identifications of the autonomous systems to which the routing message may not be propagated.

In an embodiment that could be alternative or additional to the embodiments described above, the TDC attribute may further comprise a path segment type field encoding one of the following values: a first segment type value (TRANSIT_AS_SET) indicating that the path segment value field encodes an unordered set of the one or more identifications of the autonomous systems to which the routing message may be propagated, a second segment type value (NON_TRANSIT_AS_SET) indicating that the path segment value field encodes an unordered set of the one or more identifications of the autonomous systems to which the routing message may not be propagated, a third segment type value (TRANSIT_AS_SEQUENCE) indicating that the path segment value field encodes an ordered set of the one or more identifications of the autonomous systems to which the routing message may be propagated, and a fourth segment type value (NON_TRANSIT_AS_SEQUENCE) indicating that the path segment value field encodes an ordered set of the one or more identifications of the autonomous systems to which the routing message may not be propagated. In various embodiments, the path segment type of the TDC attribute may be configured to include one value of any subset of these four values, or any other values that would identify the reasoning or conditions behind inclusion of the identifications of one or more AS's in the TDC information of the routing message, which reasoning or conditions would then allow making a decision on whether or not to propagate the routing message to the second AS.

In an embodiment where the path segment type field encodes the first segment type value, the method may further include, prior to the step of propagating the routing message, a step of determining that the one or more identifications of the autonomous systems encoded in the path segment value field includes an identification of the second AS.

In an embodiment where the path segment type field encodes the second segment type value, the method may further include, prior to the step of propagating the routing message, a step of determining that the one or more identifications of the autonomous systems encoded in the path segment value field does not include an identification of the second AS.

In an embodiment where the path segment type field encodes the third segment type value, the method may further include, prior to the step of propagating the routing message, a step of determining that an identification of the second AS immediately follows an identification of the first AS within the ordered set of the one or more identifications of the autonomous systems encoded in the path segment value field, and In an embodiment where the path segment type field encodes the fourth segment type value, the method may further include, prior to the step of propagating the routing message, a step of determining that an identification of the second AS does not immediately follow an identification of the first AS within the ordered set of the one or more identifications of the autonomous systems encoded in the path segment value field. For the purposes of the present discussion, if the path segment type field encodes the fourth segment type value and an identification of the second AS is not at all included within the ordered set encoded in the path segment value field, then the second AS cannot and does not follow an identification of the first AS within the ordered set and the routing message may be propagated to the second AS.

In an embodiment, the TDC attribute may further include a path segment length field identifying a number of the one or more identifications of the autonomous systems encoded in the path segment value field.

In an embodiment, the inter-domain routing protocol may be the Border Gateway Protocol (BGP) and the routing message may be a BGP update message. In such an embodiment, the TDC attribute may be an optional transitive attribute of the BGP as defined e.g. in RFC 4271, which is hereby incorporated by reference. Such a new BGP attribute is referred to herein as a TRANSIT_PATH attribute.

As will be appreciated by one skilled in the art, aspects of the present disclosure, in particular the functionality of the TDC logic described herein, may be embodied in various manners. Accordingly, other aspects of the present disclosure relate to systems, computer programs, mechanisms, and means for carrying out the method according to various embodiments described herein. Such systems, computer programs, mechanisms, and means could be included within various network devices, such as e.g. switches and routers, in particular within edge routers, or BGP speakers (which could be, but do not have to be, included within routers). A computer program may, for example, be downloaded (updated) to the existing network devices and systems (e.g. to the existing routers, switches, various control nodes, etc.) or be stored upon manufacturing of these devices and systems.

In yet another aspect, the present application relates to one or more non-transitory computer readable storage media encoded with software comprising computer executable instructions and, when executed by a processor of a computer, operable to carry out the method according to various embodiments described herein.

In yet another aspect, the present application relates to a data structure for enabling control of a transit of routing messages in a network comprising multiple AS's, in particular a data structure for use as a TDC attribute in an inter-AS routing protocol such as e.g. BGP. In an embodiment, the data structure includes a path segment value field encoding one or more identifications of autonomous systems to which a routing message may be propagated and/or one or more identifications of autonomous systems to which the routing message may not be propagated, and a path segment type field encoding a value selected from one of at least a first segment type value and a second segment type value as described above, and/or selected from one of a third segment type value and a fourth segment type value as described above. In an embodiment, such a data structure may be included within a BGP update message, e.g. as an optional transitive attribute of a BGP update message described herein.

Example Embodiments

Disclosed are, inter alia, methods, apparatus, data structures, computer-readable medium, mechanisms, and means for controlling inter-AS transit of routing messages which may be of particular use in Border Gateway Protocol (BGP).
Routing Basics The Internet may be viewed as a collection of Autonomous Systems, where an "Autonomous System" (AS) typically refers to a set of network elements, such as e.g. routers, switches, and controllers, under a single technical administration. An AS may also be considered to include hosts connected to the network. Segregation into different AS's allows defining administrative authorities and routing policies of different organizations.

Within an AS, network elements communicate with one another by routing packets using an interior gateway protocol (IGP) and by referring to certain common metrics. It has also become common to use several IGPs, such as e.g. Routing Information Protocol (RIP), Enhanced Interior Gateway Routing Protocol (EIGRP), Open Shortest Path First (OSPF) protocol, interior BGP (iBGP) and Intermediate System-to-Intermediate System (IS-IS) protocol, and sometimes several sets of metrics within an AS.

Externally, neighboring AS's communicate with one another by routing packets using an Exterior Gateway Protocol (EGP), the current Internet standard is BGP Version 4 (BGP-4) defined in RFC 4271, which is hereby incorporated by reference.

Each AS is "autonomous" (i.e., relatively independent from the other AS's) in a sense that is runs its own independent routing policies and unique IGPs. The use of the term "autonomous" also stresses the fact that, even when multiple IGPs and metrics are used, the administration of an AS appears to other ASs to have a single coherent interior routing plan and presents a consistent picture of what destinations are reachable through it. Exterior routing protocols were created to exchange routing information between different AS's. For example, the eBGP defines an inter-AS routing protocol, where one of the primary functions is to exchange Network Layer Reachability Information (NLRI) by means of BGP speaking systems (also often referred to as "BGP speakers") sending update messages, described in greater detail below.

FIG. 1 is a simplified schematic diagram illustrating a network 100 comprising multiple AS's, according to an embodiment of the present disclosure. In the example of FIG. 1, two AS's are illustrated as a first AS 110 and a second AS 120.

The first AS 110 includes routers 112a-112f, each of which may be operatively coupled to at least one other node within the first AS 110 as shown with solid lines between some of the routers 112a-112f. The solid lines between some of the routers 112a-112f may be viewed to represent exchange of packets according to one or more IPGs of the first AS 110, such as e.g. iBGP.

Similarly, the second AS 120 includes routers 122a-122g, each of which may be operatively coupled to at least one other node within the second AS 120 as shown with solid lines between some of the routers 122a-122g. The solid lines between some of the routers 122a-122g may be viewed to represent exchange of packets according to one or more IGPs of the second AS 120, such as e.g. iBGP.

Routers in one AS that are configured to communicate with routers in other AS's are referred to as "edge routers", while routers in one AS that are only configured to communicate with other routes in the same AS are referred to as "core routers." In the illustration of FIG. 1, routers 112a, 112b, 112e, and 112f are edge routers, while routes 112c and 112d are core routers of the first AS 110, while, for the second AS 120, routers 122a, 122b, 122d, and 122f are edge routers and routes 122c, 122e, and 122g are core routers. In FIG. 1, the dashed lines between or extending from some of the edge routers may be viewed to represent exchange of packets according to an EGP, such as e.g. eBGP.

Each of the edge routers is configured to communicate, via e.g. eBGP, with one or more edge routers in another AS. As an illustrative example, the edge routers may be service nodes (e.g. L3VPN, Layer 2 Virtual Private Network (L2VPN) endpoints) that exchange service state via BGP and Label Distribution Protocol (LDP).

A pair of edge routers from different AS's configured to communicate with one another are referred to as "EGP neighbors", e.g. "eBGP neighbors". In the illustration of FIG. 1, one pair of EGP neighbors includes routers 112b and 122b, while another pair of neighbors includes routers 112f and 122f. Other edge routers shown in FIG. 1 may also have their respective EGP neighbors in further AS's, which further AS's are not shown in FIG. 1.

In addition, one or more endpoints may access (or be considered to be included within) at least one of the AS's through various points of attachment (e.g., network access points), shown in the example of FIG. 1 with three endpoints 130 for each AS. The endpoints 130 may e.g. include hosts.

BGP Update Messages

As mentioned above, a BGP speaker is used to exchange Network Layer Reachability Information (NLRI) with other BGP systems, NLRI being unique to BGP Version 4. The NLRI is exchanged between BGP routers in so-called "update messages" used to send routing updates to peers.

When a BGP session is initialized, update messages are sent until the complete BGP table has been exchanged. Every time an update message is received, the BGP routing table is updated and the BGP route table version is incremented by one. Thus, communicating network elements initially exchange their entire BGP routing table, and then send incremental updates, using update messages.

Besides NLRI, an update message typically also includes path attributes. Typically only one NLRI is included in an update message, although there may be multiple AS paths and AS path attributes. If a BGP speaker chooses to advertise a route, it may add to or modify the path attributes of the route before advertising it to a peer.

Within an update message, routes are advertised between a pair of BGP speakers with the NLRI comprising the destination being the systems whose IP addresses are reported in the NLRI field of the update message, and the route comprising the information reported in the path attributes fields of the same update message.

In BGP, path attributes are categorized into four following categories: 1) well-known, mandatory attributes, 2) well-known discretionary attributes, 3) optional, transitive attributes, and 4) optional, non-transitive attributes.

The path attributes of the first category must appear in every update message and must be supported by all BGP implementations. If such an attribute is missing from an update message, a notification message is sent to a peer. Such attributes include e.g. AS_PATH, ORIGIN, and NEXT_HOP.

The path attributes of the second category may or may not appear in an update message but must be supported by all BGP implementations. Such attributes include e.g. LOCAL_PREF and ATOMIC_AGGREGATE.

The path attributes of the third category may or may not be supported by all BGP implementations. If it is sent in an update message but not recognized by the receiver, it should be passed on to the next AS. Such attributes include e.g. AGGREGATOR and COMMUNITY.

The path attributes of the fourth category may or may not be supported by all BGP implementations and, if received, it is not required that the router passes it on. Such attributes include e.g. MULTI_EXIT_DISC, ORIGINATOR_ID, and CLUSTER_LIST.

Sharing NLRI Between Multiple AS's

Figure 2:
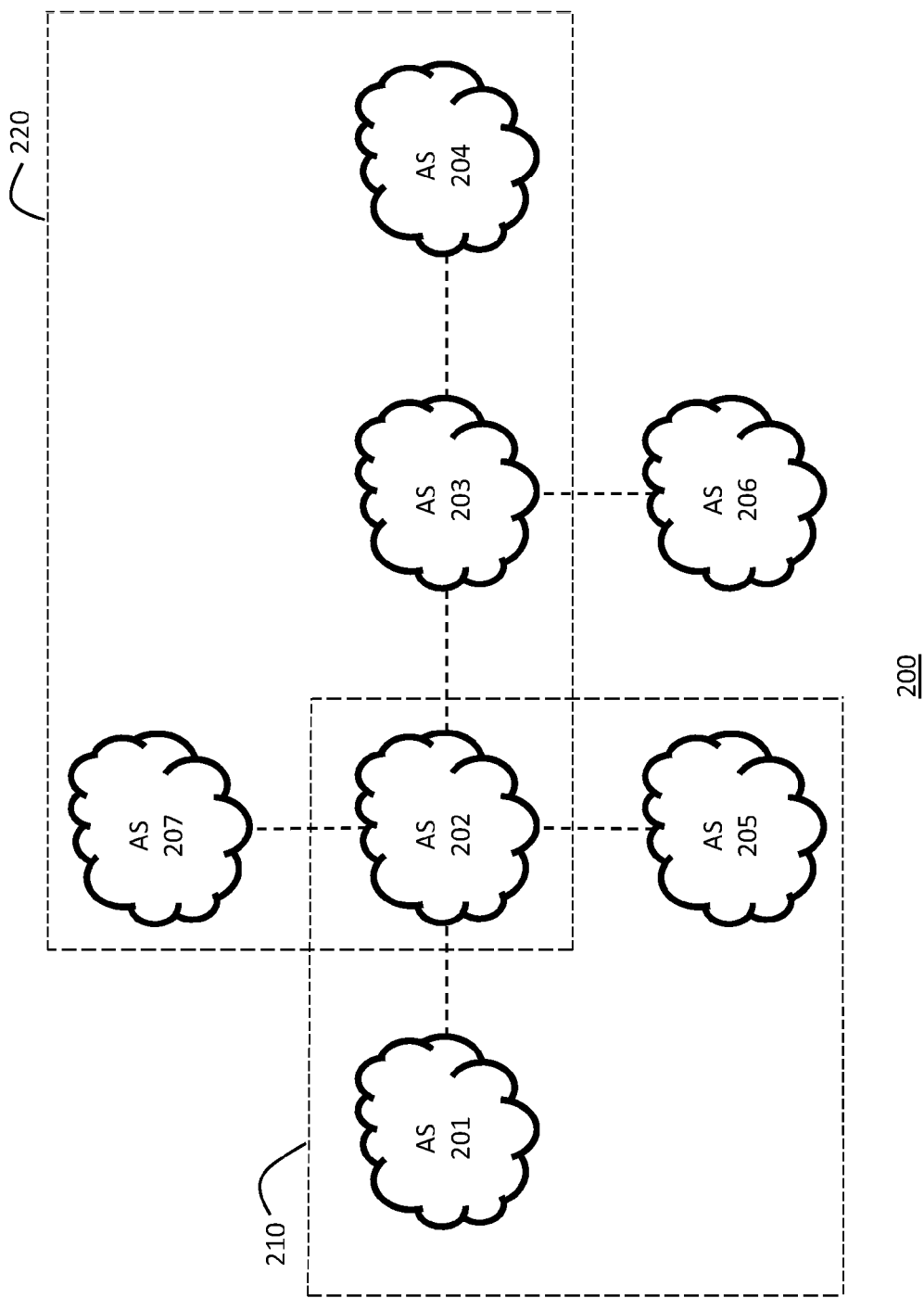
FIG. 2 is a simplified schematic diagram illustrating a network comprising different groups of multiple AS's.

FIG. 2 is a simplified schematic diagram illustrating a network 200 comprising different groups of multiple AS's, according to one embodiment of the present disclosure. An example of FIG. 2 illustrates 7 AS's, shown as AS201-207. Each of the AS's 201-207 could be an AS such as e.g. the AS 110 or AS120 shown in FIG. 1. The different AS's shown in FIG. 1 may communicate with one another, as described above for the AS's shown in FIG. 1, where the communication between the different AS's 201-207 shown in FIG. 2 with the dashed lines connecting some of the AS's. The description provided for FIG. 1 is applicable to the AS's shown in FIG. 2 and, therefore, in the interests of brevity, that description is not repeated here.

Certain AS's of the network 200 may have a business agreement to share NLRI with each other but not with other AS's. For example, AS 201, AS 202, and AS 205 may have such an agreement, thus forming one group (shown as a group 210), and AS 202, AS 203, AS 204, and AS 207 may also have such an agreement, thus forming another group (shown as a group 220).

In current state of the art, in order to honor these agreements, extreme caution have to be taken to manually configure the filters on the edge routers of the neighboring AS's to effectively control the transition domain for different NLRI's. For example, various mechanisms exist to create Access Control List (ACL)-like filters to allow or prohibit the propagation of routing information between autonomous systems. However, maintenance of such options is not simple from an operations point of view because it requires the coordination of configurations across boundaries. For example, Communities are a well-known mechanism to simplify the configuration of filters and control routing propagation. Looking at the sample network shown in FIG. 2, where AS207, AS202, AS203, and AS204 have an agreement to exchange some prefixes between them, but to not allow them to be propagated elsewhere, the use of Communities would require AS207 and AS202 to agree on a marking so that routing messages are propagated to AS203, but not to the others. As AS202 advertises to AS203, it would require the same type of agreement, noting that the Community used between AS207 and AS202 may not be the same one used between AS202 and AS203. This approach then continues down the line, resulting in a process that is not easy to operationally maintain.

Another mechanism in the current state of the art that is aimed at limiting the propagation of an update message is based on using the AS_PATHLIMIT attribute of a BGP update message (as described e.g. in https://tools.ietf.org/html/draft-ietf-idr-as-pathlimit-03), specifying the number of AS's that the update can go through. With this approach, the control is, at best, coarse, and the idea has already been discarded by the IETF.

Transit Domain Control According to Embodiments of the Present Disclosure

Embodiments provided in the present disclosure aim to improve on the deficiencies of the current state of the art by giving an originator of a routing update control over the whole transit path in a manner that does not require changes in the configuration of the transit AS's in case the source policy changes. Embodiments described in the present disclosure provide a new EGP extension, in particular EGP extension to information included in update messages, which allows giving control of the transit domain to the originator of the new updates. To that end, a method for controlling transit of routing messages in a network comprising multiple AS's is proposed. The methods may be implemented in a network 300 shown in FIG. 3.

Figure 3:
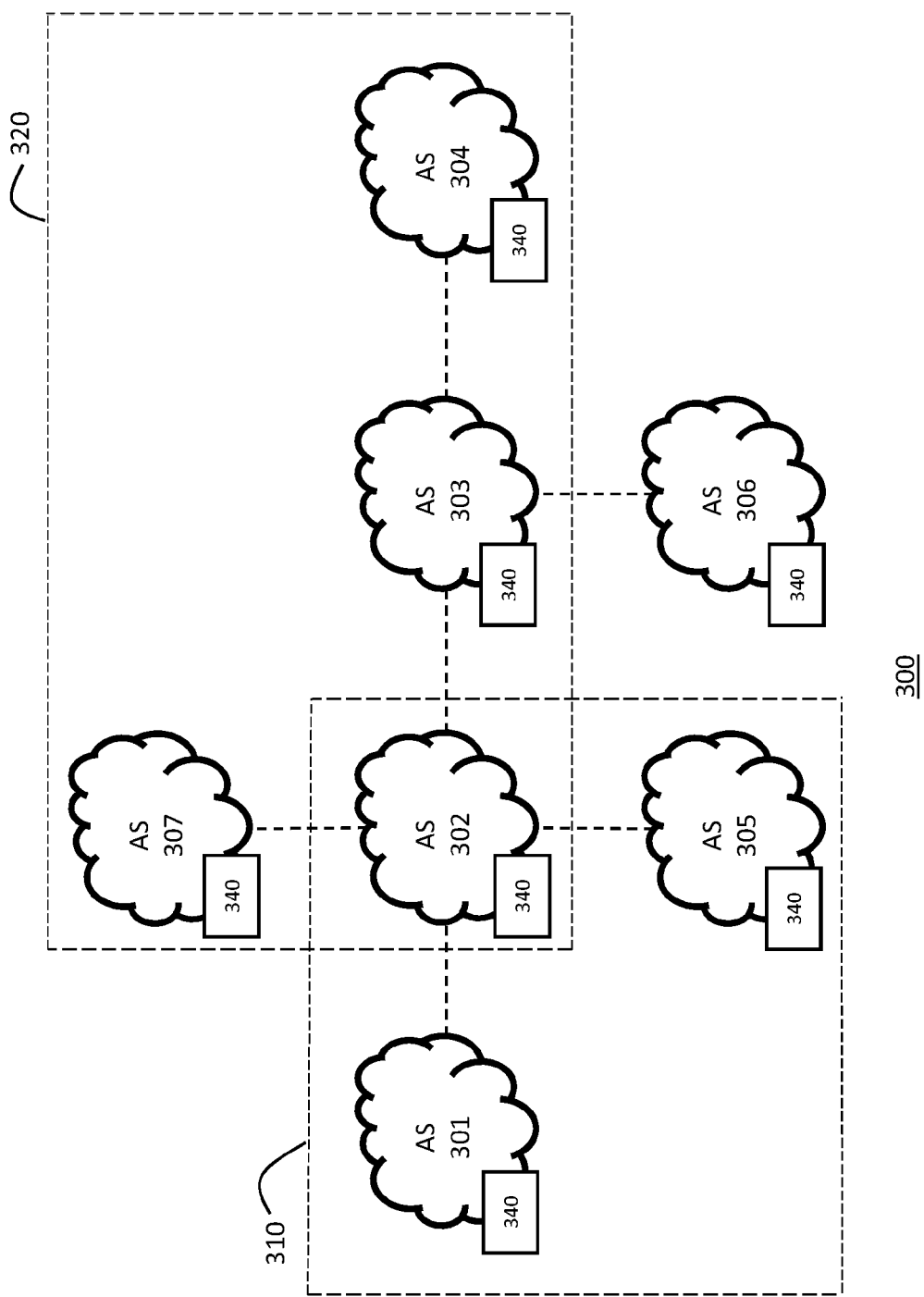
FIG. 3 is a simplified schematic diagram illustrating a network comprising multiple AS's capable of ensuring transit domain control of routing messages, according to an embodiment of the present disclosure.

Similar to FIG. 2, FIG. 3 is a simplified schematic diagram illustrating a network comprising multiple AS's 301-307, analogous to the AS's 201-207 described with reference to FIG. 2, which description is applicable to the AS's 301-307 and, in the interests of brevity, is not repeated here. In contrast to the network 100, the network 300 is capable of ensuring that transit of routing messages is controlled by implementing the method described herein. Steps of the method described herein are performed for each AS that has received a routing message of an inter-AS routing protocol (e.g. eBGP) and, therefore, are described to be performed by a so-called Transit Domain Control (TDC) logic 340.

In an embodiment, the TDC logic 340 could be implemented within one or more network elements of an AS, such as e.g. routers. In an embodiment, the TDC logic 340 could be implemented within one or more BGP speakers of an AS. Furthermore, while the TDC logic 340 is shown in FIG. 3 as individual elements, the functionality of the TDC logic 340 may be distributed over various network elements in each respective AS. In general, the TDC logic 340 may be a BGP speakers, a router, a switch, a server, or any other network element capable of carrying out the method for controlling transit of routing messages in a network comprising multiple AS's described herein. While FIG. 3 illustrates the TDC logic 340 to be included within each AS, in other embodiments, the TDC logic 340 may be included in respective entities or network elements located remote from the respective AS's (each of such logics is then still "associated" with a particular respective AS in that it is configured to perform functions for the respective designated AS).

Figure 4:
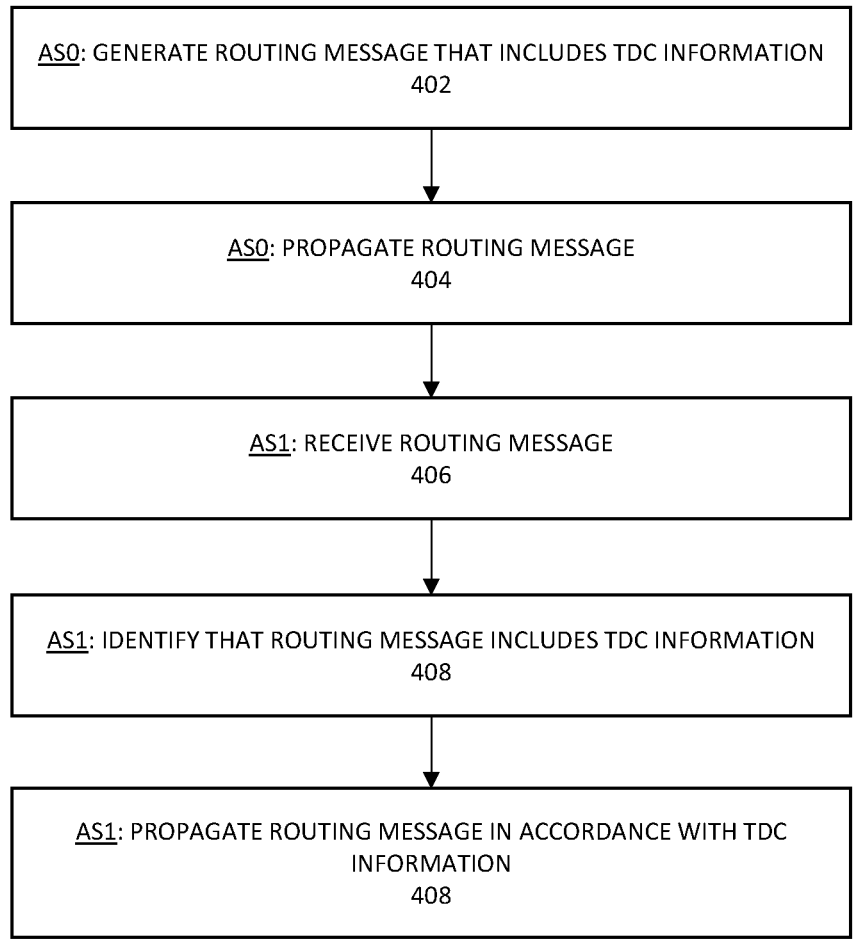
FIG. 4 is a flow diagram of a method for controlling transit of a routing message, according to an embodiment of the present disclosure.

FIG. 4 is a flow diagram of a method 400 for controlling transit of a routing message, according to an embodiment of the present disclosure. Persons skilled in the art will recognize that even though the method 400 is described with reference to the elements of the networks illustrated in FIGS. 1-3, any systems configured to carry out the steps of any of these methods, in any order, are within the scope of the present disclosure.

In summary, the method is based on the insight that including a set or list of AS identifications, e.g. AS numbers (ASN's), at the origin of a route (i.e., when/where a particular update message is generated in the first place) may allow controlling the propagation of the message through various AS's. In various embodiments, the identified AS(s) may indicate the allowed AS(s) (i.e., AS's to which the update message may be propagated) or may indicate the prohibited AS(s) (i.e., AS's to which the update message may not be propagated).

Thus, the method 400 may begin with step 402, where a TDC logic 340 of a particular AS, e.g. of AS 301 shown in FIG. 3 (referred to in FIG. 4 as the origin AS "AS0"), generates a new routing message to be distributed to other AS's over an inter-AS routing protocol. Besides including information that is typically included in such a routing message, such as e.g. source and destination prefixes and ports, protocols used, etc., the routing message also includes TDC information specifying, e.g. identifying by AS number(s) (ASNs), one or more AS's to which the routing message may be propagated and/or one or more AS's to which the routing message may not be propagated. The ASN's may be specific to identify unique AS's, or may be general to identify a Confederation or Loose Confederation. Using a (Loose) Confederation may simplify the process of indicating the ASNs involved.

In an embodiment, the AS's may be identified in an attribute of a routing message comprising at least a path segment value field encoding one or more identifications of the AS's to which the routing message may be propagated and/or one or more identifications of the AS's to which the routing message may not be propagated. In one further embodiment, the attribute may further include a path segment type field configured to indicate how the AS's in the path segment value field are identified. For example, the path segment type field may encode one of pre-defined values, some examples of which are described below.

In yet another further embodiment, the attribute may also include a path segment length field identifying a number of the one or more identifications of the AS's encoded in the path segment value field. Such an embodiment allows easy identification of the end of the attribute and/or the end of the update message.

For the business agreements shown in FIG. 3, a routing message that is generated by the TDC logic 340 of the AS 301 may include TDC information identifying AS 302 and AS 305 as AS's to which the routing message may be propagated, because these AS's belong, together with the AS 301 where the routing message is generated, to the group 310 where routing updates may be shared. Alternatively or additionally, a routing message that is generated by the TDC logic 340 of the AS 301 may include TDC information identifying AS 303, AS 304, AS 306, and AS 307 as AS's to which the routing message may not be propagated, because these AS's do not belong to the group 310 to which the AS 301 belongs.

For security purposes, in an embodiment, the TDC information included in the routing message may be signed by the origin (i.e. by the AS 301 for the example described herein). In one embodiment, such signing may be implemented using a certificate as known in the art, e.g. a Public Key Infrastructure (PKI) certificate, e.g. a Resource PKI (RPKI) certificate.

In step 404, the AS 301 propagates the routing message generated in step 402. In an embodiment, the TDC logic 340 of the AS 301 could be configured to perform a check to which AS's the message may be propagated and then propagate accordingly, e.g. as described in steps 408-410 below, i.e. as if it had received the routing message from another AS. However, since the AS 301 is the origin of the routing message, the check can be skipped and/or be implicit (i.e., the AS 301 already has the knowledge as to which other AS's the routing message may or may not be propagated).

Continuing with the example shown in FIG. 3, in step 404 the routing message would be propagated from the AS 301 to the AS 302.

Step 406 in FIG. 4 illustrates the AS 302 (referred to in FIG. 4 as the first AS "AS1") receiving the routing message from the AS 301. In current state of the art, the AS 302 would then proceed to propagate the received routing message to all other AS's to which the AS 302 is communicatively connected, i.e. to the AS 307, AS 305, and AS 303, unless some coordination of configurations of these AS's across boundaries was in place. However, according to an embodiment of the present disclosure, upon the receipt of the routing message, the TDC logic 340 associated with the AS 302 is configured to check whether the received routing message includes any TDC information.

Upon identifying that the received routing message does include such TDC information (step 408), the TDC logic 340 of the AS 302 can ensure that the routing message is propagated further in accordance with the TDC information (step 410), i.e., that the routing message is propagated from the AS 302 to those AS's which are identified as "allowed" AS's in the TDC information and/or is not propagated to those AS's which are identified as "prohibited" AS's in the TDC information. Continuing with the example shown in FIG. 3, in step 410 the routing message would be propagated from the AS 302 only to the AS 305 because they both belong to the group 310. AS 302 would not propagate the routing message to the AS 307 and AS 303 because those AS's do not belong to the group 310.

In various embodiments, including the TDC information within a routing message as described herein is configured to not overwrite the local policy of an AS, but to aid it. For example, if an AS has a policy to not advertise a specific prefix to a neighbor, the TDC logic 340 may be configured to still not advertise it even if the TDC information allows it. On the other hand, the TDC logic 340 of a sending AS may be configured to not advertise a route that is not allowed by the TDC information that would have been sent otherwise (i.e., that would have been sent according to the local policy). Thus, the TDC logic may be configured to so that "negative" policy (i.e. a policy prohibiting propagation of a routing message) takes precedence. Continuing with the example shown in FIG. 3, this would mean that the TDC logic 340 of the AS 302 would be configured to check the local policy of the AS 302 and that, in step 410, the routing message would be propagated from the AS 302 to the AS 305 only if the local policy of the AS 302 allows it. If the local policy of the AS 302 would not allow it, the routing message would not be propagated from the AS 302 to the AS 305 even though the TDC information allows it.

Embodiments of the present disclosure may be used in various settings, such as e.g. traffic engineering, excluding specific ASNs (e.g. ASNs that may match to a particular competitor or a particular country) from receiving updates, limiting route propagation to a region/country/set of AS's, and discovery of "local" (to a group of ASNs) services, such as e.g. Path Computation Element (PCE) without leaking information.

Some advantages of various embodiments of the present disclosure include controlling transit domain of routing updates in a manner that is easier than current approaches (e.g. than the filtering approach) and that can be integrated with Inter Domain Routing (IDR) security approaches. Other advantages include facilitating scoped service/information discovery with BGP and keeping the control of the policy at the originator of a routing update.

BGP Transit Domain Control

Some embodiments operate in the context of BGP, where transit domain control is ensured by including a new path attribute within BGP update messages, and these embodiments are now described. A skilled person will readily recognize, however, that these teachings are equally applicable to other embodiments and to inter-AS protocols other than eBGP, all of which, therefore, being within the scope of the present disclosure.

In an embodiment, the new path attribute, referred to herein as a TRANSIT_PATH attribute could be included within a BGP update message as one of the optional transitive attributes described herein. By explicitly defining BGP transit domains (ASNs) through which the routing information carried in an update message may or may not pass, such an attribute would allow facilitating of transit domain control.

In an embodiment, the TRANSIT_PATH attribute may be composed of a sequence of transit path segments, where each transit path segment may be represented by a triple <path segment type, path segment length, path segment value>.

Figure 5:
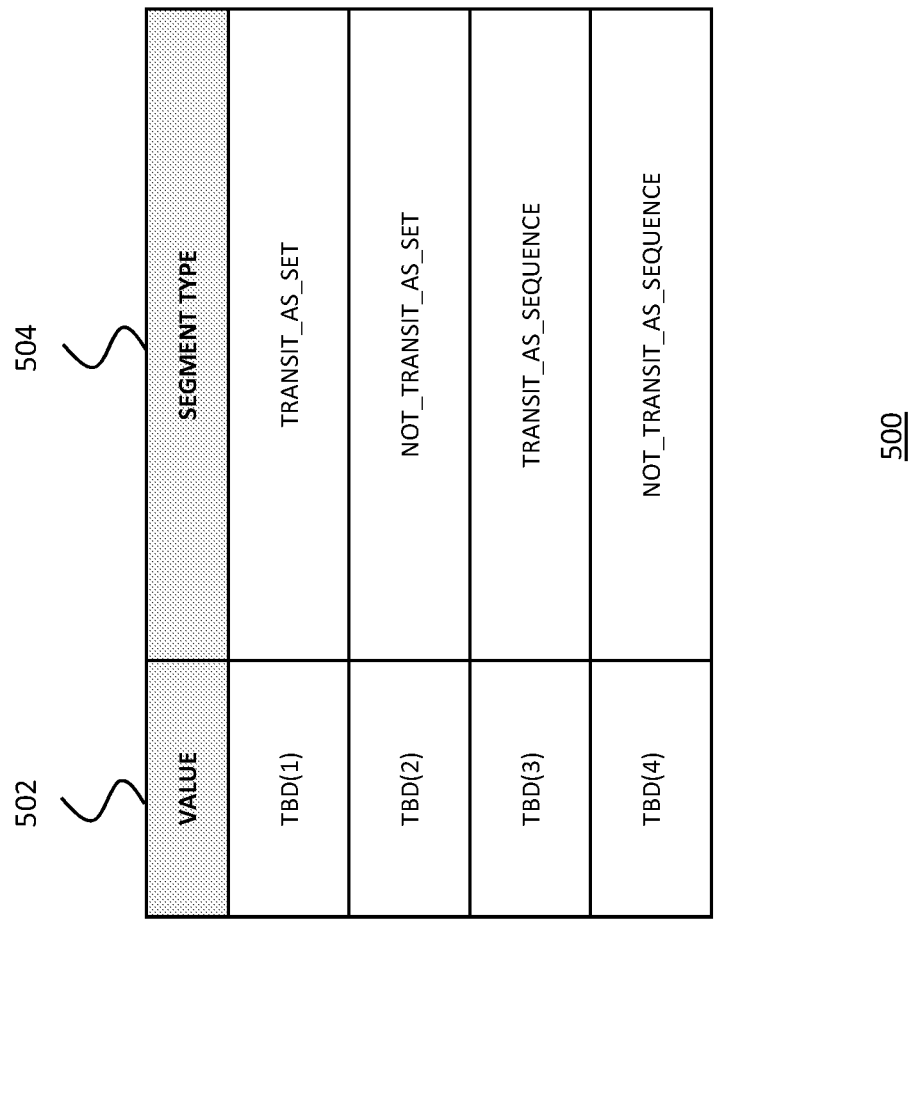
FIG. 5 is a simplified schematic diagram illustrating examples of predefined values for a path segment type field of a TDC attribute, according to an embodiment of the present disclosure.

The path segment type may be a 1-octet length field with certain specific values defined. FIG. 5 provides an illustration of some examples of predefined values for a path segment type field of a TRANSIT_PATH attribute, according to an embodiment of the present disclosure. In FIG. 5, column 502 illustrates different values, shown as "to-be-determined (TBD)" values (1)-(4), which could be encoded in the path segment type field of the attribute. Column 504 then provides an exemplary name for a segment type corresponding to each value.

As shown in FIG. 5 with row 510, encoding a value "TBD(1)" in a path segment type field of a TRANSIT_PATH attribute may be used to specify that a first segment type value (TRANSIT_AS_SET) is used, indicating that the path segment value field encodes an unordered set of the one or more identifications of the AS's to which the routing message (in this example, the BGP update message) may be propagated. As shown in FIG. 5 with row 520, encoding a value "TBD(2)" in a path segment type field of a TRANSIT_PATH attribute may be used to specify that a second segment type value (NON_TRANSIT_AS_SET) is used, indicating that the path segment value field encodes an unordered set of the one or more identifications of the AS's to which the routing message may not be propagated. As shown in FIG. 5 with row 530, encoding a value "TBD(3)" in a path segment type field of a TRANSIT_PATH attribute may be used to specify that a third segment type value (TRANSIT_AS_SEQUENCE) is used, indicating that the path segment value field encodes an ordered set of the one or more identifications of the autonomous systems to which the routing message may be propagated. Finally, as shown in FIG. 5 with row 540, encoding a value "TBD(4)" in a path segment type field of a TRANSIT_PATH attribute may be used to specify that a fourth segment type value (NON_TRANSIT_AS_SEQUENCE) is used, indicating that the path segment value field encodes an ordered set of the one or more identifications of the autonomous systems to which the routing message may not be propagated.

The path segment length may be a 1-octet length field, containing the number of AS's (not the number of octets) in the path segment value field.

The path segment value field may contain one or more AS numbers, identifying AS(s) to which the routing message may and/or may not be propagated, e.g. similar to the AS_PATH/AS4_PATH attributes.

When a BGP speaker propagates a route to an external peer, the advertising speaker may check the TRANSIT_PATH attribute as follows. If the peering AS number appears in the TRANSIT_AS_SET (or is the Originator of the route) or if the peering AS number appears, immediately following the local system's own AS number, in a TRANSIT_AS_SEQUENCE, the advertising speaker may propagate the route to the external peer. Otherwise, the advertising speaker may not propagate the route to the external peer. A receiving BGP speaker may check the TRANSIT_PATH. However, the final decision as to whether or not to propagate the received update to a certain external peer may be a local decision (i.e. a decision in accordance with a local policy of the receiving AS, as described above).

Exemplary Data Processing System

Figure 6:
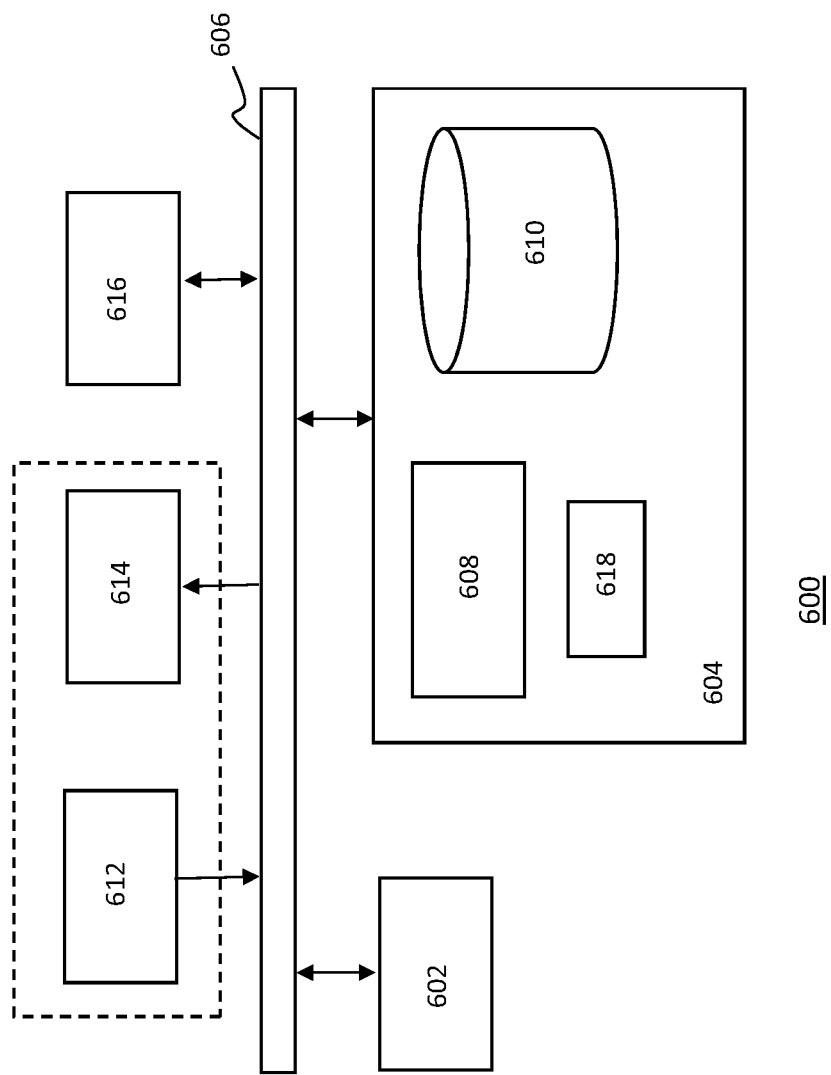
FIG. 6 depicts a block diagram illustrating an exemplary data processing system that may be used in a network as described with reference to FIG. 3, according to one embodiment of the present disclosure.

FIG. 6 depicts a block diagram illustrating an exemplary data processing system 600 that may be used in a network as described with reference to FIG. 3, according to one embodiment of the present disclosure. The data processing system 600 may e.g. be used in/as the TDC logic 340 illustrated in FIG. 3.

As shown in FIG. 6, the data processing system 600 may include at least one processor 602 coupled to memory elements 604 through a system bus 606. As such, the data processing system may store program code within memory elements 604. Further, the processor 602 may execute the program code accessed from the memory elements 604 via a system bus 606. In one aspect, the data processing system may be implemented as a computer that is suitable for storing and/or executing program code. It should be appreciated, however, that the data processing system 600 may be implemented in the form of any system including a processor and a memory that is capable of performing the functions described within this specification.

The memory elements 604 may include one or more physical memory devices such as, for example, local memory 608 and one or more bulk storage devices 610. The local memory may refer to random access memory or other non-persistent memory device(s) generally used during actual execution of the program code. A bulk storage device may be implemented as a hard drive or other persistent data storage device. The processing system 600 may also include one or more cache memories (not shown) that provide temporary storage of at least some program code in order to reduce the number of times program code must be retrieved from the bulk storage device 610 during execution.

Input/output (I/O) devices depicted as an input device 612 and an output device 614 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 6 with a dashed line surrounding the input device 612 and the output device 614). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 616 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 600, and a data transmitter for transmitting data from the data processing system 600 to said systems, devices and/or networks. Modems, cable modems, and Ethernet cards are examples of different types of network adapter that may be used with the data processing system 600.

As pictured in FIG. 6, the memory elements 604 may store an application 618. In various embodiments, the application 618 may be stored in the local memory 608, the one or more bulk storage devices 610, or apart from the local memory and the bulk storage devices. It should be appreciated that the data processing system 600 may further execute an operating system (not shown in FIG. 6) that can facilitate execution of the application 618. The application 618, being implemented in the form of executable program code, can be executed by the data processing system 600, e.g., by the processor 602. Responsive to executing the application, the data processing system 600 may be configured to perform one or more operations or method steps described herein.

Persons skilled in the art will recognize that while the elements 602-618 are shown in FIG. 6 as separate elements, in other embodiments their functionality could be implemented in lesser number of individual elements or distributed over a larger number of components.

VARIATIONS AND IMPLEMENTATIONS

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the transit domain control operations thereof. This may be inclusive of appropriate algorithms and communication protocols that allow for the effective exchange of data or information.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

In one implementation, AS's and/or various network elements such as e.g. routers described herein may include software to achieve (or to foster) the functions discussed herein for transit domain control where the software is executed on one or more processors to carry out the functions. This could include the implementation of instances of TDC logic and/or any other suitable element that would foster the activities discussed herein. Additionally, each of these elements can have an internal structure (e.g., a processor, a memory element, etc.) to facilitate some of the operations described herein. In other embodiments, these functions for transit domain control may be executed externally to these elements, or included in some other network element to achieve the intended functionality. Alternatively, AS's, TDC logic, and various other elements described herein may include software (or reciprocating software) that can coordinate with other network elements in order to achieve the transit domain control functions described herein. In still other embodiments, one or several devices may include any suitable algorithms, hardware, software, components, modules, interfaces, or objects that facilitate the operations thereof.

In certain example implementations, the transit domain control functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as e.g. policy or mapping databases to enable transit domain control functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving transit domain control, as outlined herein. Additionally, each of these devices may include a processor that can execute software or an algorithm to perform the transit domain control activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of transit domain control, as potentially applied to a myriad of other architectures.

It is also important to note that the steps in the FIG. 4 illustrate only some of the possible scenarios that may be executed by, or within, the AS(s)/TDC logic(s) described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the AS's, TDC logics, and various network elements in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for controlling transit of routing messages in a network comprising multiple autonomous systems, the method comprising:
   identifying that a routing message of an inter-autonomous system (AS) routing protocol received at a first AS comprises transit domain control (TDC) information specifying one or more autonomous systems to which the routing message may be propagated;
   propagating the routing message from the first AS to a second AS when the second AS is one of the one or more autonomous systems specified in the TDC; and
   preventing propagation of the routing message from the first AS to the second AS when the second AS is not one of the one or more autonomous systems specified in the TDC.

2. The method according to claim 1, wherein the TDC information is included within a path segment value field of a TDC attribute.

3. The method according to claim 2, wherein the TDC attribute further includes a path segment type field comprising
   a segment type value indicating that the path segment value field includes an unordered set of the one or more identifications of the autonomous systems to which the routing message may be propagated.

4. The method according to claim 3, wherein
   the method further comprises, prior to propagating the routing message, determining that the one or more identifications of the autonomous systems included in the path segment value field includes an identification of the second AS.

5. The method according to claim 2, wherein the TDC attribute further includes a path segment type field comprising
   a segment type value indicating that the path segment value field includes an ordered set of the one or more identifications of the autonomous systems to which the routing message may be propagated.

6. The method according to claim 5, wherein
   the method further comprises, prior to propagating the routing message, determining that an identification of the second AS follows an identification of the first AS within the ordered set of the one or more identifications of the autonomous systems included in the path segment value field.

7. The method according to claim 2, wherein the TDC attribute further includes a path segment length field identifying a number of the one or more identifications of the autonomous systems included in the path segment value field.

8. The method according to claim 2, wherein the TDC attribute is an optional transitive attribute of a Border Gateway Protocol (BGP).

9. A system for controlling transit of routing messages in a network comprising multiple autonomous systems, the system comprising:
at least one memory configured to store computer executable instructions; and
at least one processor coupled to the at least one memory and configured, when executing the instructions, to:
identify that a routing message of an inter-autonomous system (AS) routing protocol received at a first AS comprises transit domain control (TDC) information specifying one or more autonomous systems to which the routing message may not be propagated,
propagate the routing message from the first AS to a second AS when the second AS is not one of the one or more autonomous systems specified in the TDC, and
prevent propagation of the routing message from the first AS to the second AS when the second AS is one of the one or more autonomous systems specified in the TDC.

10. The system according to claim 9, wherein the TDC information is included within a path segment value field of a TDC attribute.

11. The system according to claim 10, wherein the TDC attribute further includes a path segment type field comprising one of:
a first segment type value indicating that the path segment value field includes an unordered set of the one or more identifications of the autonomous systems to which the routing message may not be propagated, and
a second segment type value indicating that the path segment value field includes an ordered set of the one or more identifications of the autonomous systems to which the routing message may not be propagated.

12. The system according to claim 11, wherein the at least one processor is further configured to:
when the path segment type field includes the first segment type value, then, prior to propagating the routing message, determine that the one or more identifications of the autonomous systems included in the path segment value field does not include an identification of the second AS, and
when the path segment type field includes the second segment type value, then, prior to propagating the routing message, determine that an identification of the second AS does not follow an identification of the first AS within the ordered set of the one or more identifications of the autonomous systems included in the path segment value field.

13. The system according to claim 10, wherein the TDC attribute further includes a path segment length field identifying a number of the one or more identifications of the autonomous systems included in the path segment value field.

14. The system according to claim 9, wherein the inter-domain routing protocol is a Border Gateway Protocol (BGP) and the routing message is a BGP update message.

15. One or more non-transitory computer readable storage media encoded with software comprising computer executable instructions and when the software is executed operable to:
identify whether a routing message of an inter-autonomous system (AS) routing protocol received at a first AS comprises transit domain control (TDC) information specifying one or more autonomous systems to which the routing message may be propagated or one or more autonomous systems to which the routing message may not be propagated;
when the TDC information specifies one or more autonomous systems to which the routing message may be propagated, propagate the routing message from the first AS to a second AS when the second AS is one of the one or more autonomous systems specified in the TDC, and prevent propagation of the routing message from the first AS to the second AS when the second AS is not one of the one or more autonomous systems specified in the TDC;
when the TDC information specifies one or more autonomous systems to which the routing message may not be propagated, propagate the routing message from the first AS to the second AS when the second AS is not one of the one or more autonomous systems specified in the TDC, and prevent propagation of the routing message from the first AS to the second AS when the second AS is one of the one or more autonomous systems specified in the TDC.

16. The one or more non-transitory computer readable media according to claim 15, wherein the TDC information is included within a TDC attribute comprising a path segment value field including one or more identifications of the autonomous systems to which the routing message may be propagated or one or more identifications of the autonomous systems to which the routing message may not be propagated.

17. The one or more non-transitory computer readable media according to claim 16, wherein the TDC attribute further comprises a path segment type field including at least one of:
a first segment type value indicating that the path segment value field includes an unordered set of the one or more identifications of the autonomous systems to which the routing message may be propagated,
a second segment type value indicating that the path segment value field includes an unordered set of the one or more identifications of the autonomous systems to which the routing message may not be propagated,
a third segment type value indicating that the path segment value field includes an ordered set of the one or more identifications of the autonomous systems to which the routing message may be propagated, and
a fourth segment type value indicating that the path segment value field includes an ordered set of the one or more identifications of the autonomous systems to which the routing message may not be propagated.

18. The one or more non-transitory computer readable media according to claim 17, further operable to:
when the path segment type field includes the first segment type value, then, prior to propagating the routing message, determine that the one or more identifications of the autonomous systems included in the path segment value field includes an identification of the second AS,
when the path segment type field includes the second segment type value, then, prior to propagating the routing message, determine that the one or more identifications of the autonomous systems included in the path segment value field does not include an identification of the second AS,
when the path segment type field includes the third segment type value, then, prior to propagating the routing message, determine that an identification of the second AS follows an identification of the first AS within the ordered set of the one or more identifications of the autonomous systems included in the path segment value field, and when the path segment type field includes the fourth segment type value, then, prior to propagating the routing message, determine that an identification of the second AS does not follow an identification of the first AS within the ordered set of the one or more identifications of the autonomous systems included in the path segment value field.

19. The one or more non-transitory computer readable media according to claim 15, wherein the inter-domain routing protocol is a Border Gateway Protocol (BGP) and the routing message is a BGP update message.

20. A method for controlling transit of routing messages in a network comprising multiple autonomous systems, the method comprising:

identifying that a Border Gateway Protocol (BGP) update message received at a first autonomous system (AS) comprises transit domain control (TDC) information specifying one or more autonomous systems to which the BGP update message may be propagated or one or more autonomous systems to which the BGP update message may not be propagated;

when the TDC information specifies one or more autonomous systems to which the BGP update message may be propagated, propagating the routing message from the first AS to a second AS if the second AS is one of the one or more autonomous systems specified in the TDC; and when the TDC information specifies one or more autonomous systems to which the BGP update message may not be propagated, propagating the routing message from the first AS to the second AS if the second AS is not one of the one or more autonomous systems specified in the TDC.

21. The method according to claim 20, wherein the TDC information is included within a BGP attribute comprising a path segment value that includes one or more identifications of the autonomous systems to which the routing message may be propagated or one or more identifications of the autonomous systems to which the routing message may not be propagated.

22. A system for controlling transit of routing messages in a network comprising multiple autonomous systems, the system comprising:

at least one memory configured to store computer executable instructions; and at least one processor coupled to the at least one memory and configured, when executing the instructions, to:

identify that a Border Gateway Protocol (BGP) update message received at a first autonomous system (AS) comprises transit domain control (TDC) information specifying one or more autonomous systems to which the BGP update message may be propagated or one or more autonomous systems to which the BGP update message may not be propagated, when the TDC information specifies one or more autonomous systems to which the BGP update message may be propagated, propagate the routing message from the first AS to a second AS if the second AS is one of the one or more autonomous systems specified in the TDC, and when the TDC information specifies one or more autonomous systems to which the BGP update message may not be propagated, propagate the routing message from the first AS to the second AS if the second AS is not one of the one or more autonomous systems specified in the TDC.

23. The system according to claim 22, wherein the TDC information is included within a BGP attribute comprising a path segment value that includes one or more identifications of the autonomous systems to which the routing message may be propagated or one or more identifications of the autonomous systems to which the routing message may not be propagated.

24. A system for controlling transit of routing messages in a network comprising multiple autonomous systems, the system comprising:

at least one memory configured to store computer executable instructions; and at least one processor coupled to the at least one memory and configured, when executing the instructions, to:

identify that a routing message of an inter-autonomous system (AS) routing protocol received at a first AS comprises transit domain control (TDC) information specifying one or more autonomous systems to which the routing message may be propagated, propagate the routing message from the first AS to a second AS when the second AS is one of the one or more autonomous systems specified in the TDC, and prevent propagation of the routing message from the first AS to the second AS when the second AS is not one of the one or more autonomous systems specified in the TDC.

25. The system according to claim 24, wherein the TDC information is included within a path segment value field of a TDC attribute, the TDC attribute further including a path segment type field comprising a segment type value indicating either that the path segment value field includes an unordered set of the one or more identifications of the autonomous systems to which the routing message may be propagated or that the path segment value field includes an ordered set of the one or more identifications of the autonomous systems to which the routing message may be propagated.

26. A method for controlling transit of routing messages in a network comprising multiple autonomous systems, the method comprising:

identifying that a routing message of an inter-autonomous system (AS) routing protocol received at a first AS comprises transit domain control (TDC) information specifying one or more autonomous systems to which the routing message may not be propagated;

propagating the routing message from the first AS to a second AS when the second AS is not one of the one or more autonomous systems specified in the TDC; and preventing propagation of the routing message from the first AS to the second AS when the second AS is one of the one or more autonomous systems specified in the TDC.

27. The method according to claim 26, wherein the TDC information is included within a path segment value field of a TDC attribute, the TDC attribute further including a path segment type field comprising a segment type value indicating either that the path segment value field includes an unordered set of the one or more identifications of the autonomous systems to which the routing message may not be propagated or that the path segment value field includes an ordered set of the one or more identifications of the autonomous systems to which the routing message may not be propagated.

* * * * *